United States Patent
Lindmark et al.

(10) Patent No.: US 9,221,421 B2
(45) Date of Patent: Dec. 29, 2015

(54) BONNET ARRANGEMENT

(71) Applicant: VOLVO CAR CORPORATION, Gothenburg (SE)

(72) Inventors: Peter Lindmark, Hisings Backa (SE); Jonas Skogh, Gothenburg (SE); Staffan Jaktling, Vastra Frolunda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/249,808

(22) Filed: Apr. 10, 2014

(65) Prior Publication Data

US 2014/0312653 A1 Oct. 23, 2014

(30) Foreign Application Priority Data

Apr. 19, 2013 (EP) .................................. 13164389

(51) Int. Cl.
   *B60R 21/34* (2011.01)

(52) U.S. Cl.
   CPC ........... *B60R 21/34* (2013.01); *B60R 2021/343* (2013.01)

(58) Field of Classification Search
   CPC .............. B60R 2021/343; B60R 21/34; B60R 2019/186; B60R 2021/346; B60R 2021/0044; B60R 2021/0053; B62D 25/12; B62D 25/163; B62D 25/105
   USPC .................. 296/187.04, 187.09, 192, 193.11; 180/274, 69.2; 293/120
   See application file for complete search history.

(56) References Cited

U.S. PATENT DOCUMENTS

| 7,537,073 | B2 * | 5/2009 | Kalliske et al. ............ 180/69.24 |
| 7,934,293 | B2 * | 5/2011 | Kalargeros ....................... 16/369 |
| 8,118,352 | B2 | 2/2012 | Rocheblave et al. |
| 2007/0246281 | A1 * | 10/2007 | Parks ........................... 180/69.2 |
| 2009/0288271 | A1 * | 11/2009 | Kmieciak et al. ............... 16/308 |
| 2012/0139296 | A1 * | 6/2012 | Wilkens et al. .......... 296/193.11 |

FOREIGN PATENT DOCUMENTS

| DE | 102004011334 A1 | 11/2005 |
| DE | 102006052189 A1 | 5/2008 |
| DE | 102009006464 A1 | 7/2010 |
| FR | 2916712 A1 | 12/2008 |
| FR | 2943978 A1 | 10/2010 |
| WO | 2008062143 A2 | 5/2008 |

OTHER PUBLICATIONS

Extended European Search Report Dated Jun. 26, 2013, Application No. 13164389.2-1503, Applicant Volvo Car Corporation, 5 Pages.

(Continued)

*Primary Examiner* — Glenn Dayoan
*Assistant Examiner* — Sunsurraye Westbrook
(74) *Attorney, Agent, or Firm* — Brooks Kushman P.C.

(57) ABSTRACT

The present disclosure relates to a bonnet arrangement for a vehicle, the bonnet arrangement including a bonnet and a hinge arrangement, which is adapted to be attached to the bonnet. The hinge arrangement is arranged to permit pivotal displacement of the bonnet relative to the vehicle around a first pivot axis located in the hinge arrangement. The bonnet arrangement further includes a passive energy absorbing member positioned and arranged so as to absorb impact energy from an impact occurring at the bonnet in a region above the hinge arrangement. The energy absorbing member may be adapted to be attached to the bonnet and/or to the hinge arrangement.

20 Claims, 5 Drawing Sheets

(56) References Cited

OTHER PUBLICATIONS

Rolf Eppinger et al., Development of Improved Injury Criteria for the Assessment of Advanced Automotive Restraint Systems—II, Published Nov. 1999, 180 Pages.

Inter Regs Ltd 2010, Global Registry, "Pedestrian Safety", Global Technical Regulation No. 09, Mar. 2010, ECT/TRANS/180.Add.9/Corr.1, Mar. 5, 2010, pp. 1-77.
For Safer Cars EURO NCAP, www.euroncap.com, European New Car Assessment Programme (Euro NCAP) Pedestrian Testing Protocol, Version 6.2.1, Feb. 2013, 62 Pages.

* cited by examiner

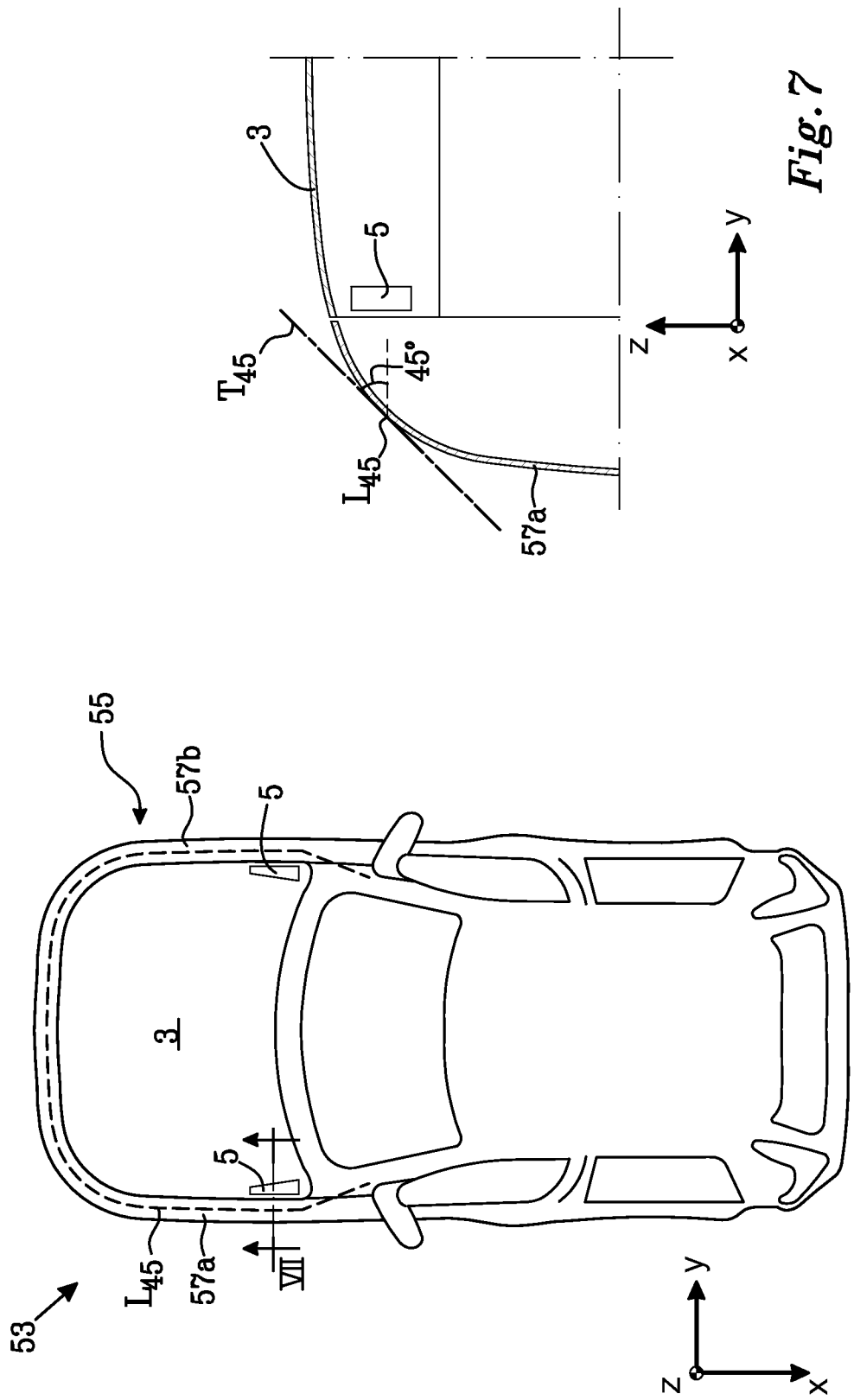

BONNET ARRANGEMENT

CROSS-REFERENCE TO RELATED APPLICATIONS

This application claims foreign priority benefits under 35 U.S.C. §119(a)-(d) to European patent application number EP 13164389.2, filed Apr. 19, 2013, which is incorporated by reference in its entirety.

TECHNICAL FIELD

The present disclosure relates to a bonnet arrangement for a vehicle. The disclosure further relates to a hinge arrangement, a kit comprising the hinge arrangement and an energy absorbing member, as well as a vehicle comprising the bonnet arrangement.

BACKGROUND

When a vulnerable road user, such as a pedestrian or a cyclist, is hit by a front of a vehicle, e.g., when crossing a street, there is a risk that the vulnerable road user is thrown into the air and lands on the vehicle, e.g., on the bonnet or the windscreen. In particular, there is a risk that a head of the vulnerable road user impacts with the vehicle. In order to mitigate the consequences of such an impact, it is known technology to raise the bonnet, e.g., by means of an airbag and/or a pyrotechnic means, in order to create a gap between the bonnet and any hard parts below the bonnet, which could pose a potential risk for injury to the vulnerable road user.

An example of such a hard part located below the bonnet is the hinge arrangement for the bonnet. The hinge arrangement is used to open the bonnet by rotation around a first pivot axis located in the hinge arrangement, e.g., in order to gain access to an engine compartment for maintenance or repair. There may be a hinge arrangement adjacent to each lateral side of the rear end of the bonnet, i.e., the end located towards the windscreen. If the vulnerable road user impacts with the bonnet in a region above the hinge arrangement, there is a risk that the head will impact with the hinge arrangement via the bonnet, when the bonnet deforms downwards because of the impact. Often, the part of the hinge arrangement comprising the pivot axis is located directly, or very closely, below the bonnet and thus poses a potential injury risk for a head impacting with the bonnet above this position.

In order to reduce such risks, it is known technology to locate the hinge arrangement close to the lateral side of the vehicle. However, such a location will restrict the possible configuration and design of the bonnet, the A-pillar, the front fender and/or the hinge arrangement.

The Head Injury Criterion, herein abbreviated as HIC, is a measure of the likelihood of a head injury arising from an impact. The HIC value can be used to assess safety related to vehicles. It is defined as:

$$HIC = \max\left[\frac{1}{t_2 - t_1}\int_{t_1}^{t_2} a(t)\,dt\right]^{2.5}(t_2 - t_1)$$

wherein $t_1$ and $t_2$ are two arbitrary times during the acceleration pulse. Acceleration is measured in multiples of the acceleration of gravity, g, and time is measured in seconds. For the values mentioned herein, HIC is evaluated over a maximum 15 milliseconds time interval. The calculation of HIC is further described in the document "Development of Improved Injury Criteria for the Assessment of Advanced Automotive Restraint Systems—II", by Eppinger et al, published in November 1999.

In order to reduce the likelihood of a head injury, the HIC value should be low. It is desirable that the HIC value should be below 1750, preferably below 1500, more preferably below 1000 and most preferably below 650. Some countries have legal requirements for the HIC value. See for example Global Technical Regulation No. 9 Pedestrian Safety, Directive 2003/102/EC or TRIAS 63, Japan.

When evaluating the likelihood of a head injury for a pedestrian being hit by a vehicle and landing on the bonnet, HIC values are determined for a grid of points on a surface of the bonnet. This surface is at least partly delimited by a line representing a 45 degree tangent, i.e. the surface is mainly on the relatively flat portion of the bonnet, leaving the curved portions, e.g. the front fenders, outside this surface. See e.g., the EuroNCAP test described in "European New Car Assessment Programme, Pedestrian Testing Protocol", Version 6.2.1, February 2013.

In the above-mentioned example of known technology, i.e., locating the hinge arrangement close to the lateral side of the vehicle, the hinge arrangement will be outside the grid used for the HIC measurement. Thus the HIC measurement will in that case not be influenced by the hinge arrangement. However, the risk of head injury caused by the hinge arrangement is still there, if the vulnerable road user would land in a region above the hinge arrangement, e.g., at an oblique angle on the vehicle.

SUMMARY

An object of the present disclosure is to overcome or ameliorate at least one of the disadvantages of the prior art, or to provide a useful alternative.

It is desirable to provide a bonnet arrangement reducing the risk of a head injury for a vulnerable road user being thrown onto the bonnet.

It is further desirable to provide a bonnet arrangement offering a high degree of freedom when configuring and designing the bonnet, the A-pillar, the front fender and/or the hinge arrangement.

Thus, in a first aspect of the present disclosure there is provided a bonnet arrangement for a vehicle, the bonnet arrangement comprising a bonnet, and a hinge arrangement, which is adapted to be attached to the bonnet. The hinge arrangement is arranged to permit pivotal displacement of the bonnet relative to the vehicle around a first pivot axis located in the hinge arrangement. The bonnet arrangement further comprises a passive energy absorbing member, which is positioned and arranged so as to absorb impact energy from an impact occurring at the bonnet in a region above the hinge arrangement.

The expression "passive energy absorbing member" is used herein to denote an energy absorbing member, which is adapted to work without any need of activation. It is always there; it is always ready to perform energy absorption The energy absorbing member used in the bonnet arrangement according to the disclosure differs from the use of an active energy absorbing member, such as an airbag or a piston raised by a pyrotechnic means, in that no activation is needed, e.g. as a gas initiator for the airbag or the pyrotechnic means for the piston. There is no need for any sensors or electronics for the passive energy absorbing member. It offers a robust and cost efficient solution.

The expression "in a region above the hinge arrangement" as used herein relates to the region of the bonnet being located above the hinge arrangement and in the vicinity of the hinge arrangement. If the head impacts with the bonnet within the region there is a risk that the bonnet can be deformed in such a way that the head may be injured by the hinge arrangement. The region may be centered around the energy absorbing member. The region may have a radius related to the size of the head of a normal adult person. The radius of the region may be in the range of 0.1-20 cm, or in the range of 1-10 cm or in the range of 1-5 cm. The region above the hinge arrangement comprises the portion of the bonnet being located directly above the hinge arrangement.

The use of the terms above, below, lateral, longitudinal, forward, rear and behind herein relates to a condition when the bonnet arrangement is mounted in a vehicle, and the vehicle stands on flat ground. During manufacturing and storage, the bonnet arrangement or its elements: the bonnet, the hinge arrangement and the energy absorbing member, may be stored in other positions and orientations, such that a position being above, when seen as mounted in the vehicle, may be below or beside during manufacturing or storage.

The energy absorbing member is adapted to absorb energy, preferably in a predefined controllable way, e.g., by deformation and/or compression, in case of an impact at the bonnet in a region above the hinge arrangement. The deformation may be elastic and/or plastic. Further, the energy absorbing member may work as a distance means, e.g., between the bonnet and the hinge arrangement, gradually reducing the distance during absorption of energy. Hence, in an initial phase of an impact, the impact energy is absorbed by the bonnet and the energy absorbing member. Thereby the HIC value for a vehicle comprising a bonnet arrangement according to the disclosure will be lower for an impact occurring at the bonnet in a region above the hinge arrangement, as compared to a conventional bonnet arrangement having no energy absorbing member.

The energy absorbing member may comprise a bracket, a resilient member and/or a hydraulic member.

The energy absorbing member may be attached to the bonnet, e.g., at an end region of the energy absorbing member. Alternatively, the energy absorbing member may be attached to the hinge arrangement, e.g., at an end region of the energy absorbing member. As another alternative, the energy absorbing member may be attached to both the bonnet and the hinge arrangement, e.g., at opposite end regions of the energy absorbing member. If the energy absorbing member is attached at one end region only, it may abut at another end region, e.g., against the bonnet, the hinge arrangement, the vehicle body or an A-pillar.

For the case that the energy absorbing member is adapted for abutment, there may be an initial gap between the energy absorbing member and the object it is adapted to abut against, e.g., the bonnet, the hinge arrangement, the vehicle body or the A-pillar. In case of an impact at the bonnet in a region above the hinge arrangement, the bonnet may in that case first give way a short distance corresponding to the initial gap, and thereafter the energy absorbing member will start absorbing energy.

The attachment is preferably arranged such that the energy absorbing member is fixed to the object it is attached to, e.g., by attachment means in the form a screw, a rivet, a clip, a weld nut, a weld screw or a nut and bolt connection. As an alternative, or as a complement, the energy absorbing member may be glued or welded to the bonnet, the hinge arrangement, the vehicle body and/or the A-pillar.

The configuration of the energy absorbing member, in particular how it is configured and dimensioned to absorb impact energy, is preferably selected considering the mechanical properties of the bonnet, in particular the impact properties, such that the bonnet arrangement as a whole will reduce the likelihood of a head injury if the impact occurs at the bonnet in a region above the hinge arrangement.

Usually, a bonnet arrangement comprises more than one hinge arrangement, e.g., one hinge arrangement adjacent to each lateral side of the bonnet. In that case the hinge arrangements may be mirror-inverted to each other. The energy absorbing member may in that case also be mirror-inverted or it may be the same at both lateral positions.

One step of the manufacturing process may be to attach the bonnet to the hinge arrangement and to attach the energy absorbing member to the bonnet and/or to the hinge arrangement. Purely as an example, the energy absorbing member may firstly be attached to the hinge arrangement. Thereafter, the energy absorbing member may be attached to the bonnet in the same step as the bonnet is attached to the hinge arrangement.

The hinge arrangement is attached to the vehicle body, preferably in a fixed way, e.g., by attachment means in the form a screw, or a nut and bolt connection. The first pivot axis makes it possible to displace the bonnet in relation to the vehicle body by means of rotation around the first pivot axis. The attachment of the hinge arrangement to the vehicle body may be configured to be substantially intact after an impact of e.g., a head of the vulnerable road user, since the impact energy is absorbed by the energy absorbing member. This makes it possible to attach the hinge arrangement in a robust and reliable way to the vehicle body.

The energy absorbing member may be adapted to be located at least partly above the hinge arrangement, above being related to as seen when mounted in a vehicle. The energy absorbing member may e.g., extend upwards from the hinge arrangement or downwards from the bonnet.

The bonnet has a longitudinal extension in an intended direction of travel of the vehicle. The bonnet has a rear end, i.e., the end located towards the windscreen of the vehicle.

In an embodiment the hinge arrangement is adapted to be attached to the bonnet at a hinge attachment zone. The energy absorbing member is then located longitudinally rearwards of the hinge attachment zone, preferably at or adjacent to the rear end of the bonnet. The energy absorbing member may be located at a smallest longitudinal distance of between 0 and 50 mm, preferably between 10 mm and 40 mm, and most preferably between 20 mm and 30 mm from the rear end of the bonnet. By longitudinal distance is meant a distance measured in a plane being parallel to the ground, assuming the vehicle is standing on a flat ground.

For this embodiment, the bonnet may comprise a first region extending between the energy absorbing member and the hinge attachment zone. In that case, the first region together with a part of the hinge arrangement and the energy absorbing member form a closed perimeter, when seen from the side. The closed perimeter may be beneficial for absorbing impact energy. If there is an initial gap between the energy absorbing member and the object it abuts against, i.e., the bonnet or the hinge arrangement, there may firstly be a deformation of the bonnet closing the initial gap, before the closed perimeter is obtained.

A smallest longitudinal distance between the hinge attachment zone and the energy absorbing member may be between 10 and 200 mm, preferably between 50 and 150 mm, more preferably between 75 and 125 mm. The longitudinal distance is measured from the rear end of the hinge attachment zone to the attachment of the energy absorbing member. If the energy absorbing member has more than one attachment, the longitudinal distance is to the most forward of the attachments of the energy absorbing member. The longitudinal distance may be measured along the hinge arrangement and/or along the bonnet, depending on if the energy absorbing member is attached to the hinge arrangement and/or the bonnet. If the hinge arrangement or the bonnet is inclined in relation to the flat ground, the actual distance along the inclined object will be longer, depending on the inclination angle.

The energy absorbing member may extend between a portion of the bonnet and a portion of the hinge arrangement. It may be attached to the bonnet and/or to the hinge arrangement.

The energy absorbing member may comprise a bracket, a resilient member, such as a spring, and/or a hydraulic member. Any one of these exemplary members may absorb energy in a predefined way.

The energy absorbing member may be adapted to deform in a predefined way. If the energy absorbing member is a bracket the predefined way of deformation may be due to the bracket comprising a deformation zone having a surface being located out of the plane in relation to a main surface of the bracket, due to an opening or a notch in the bracket and/or due to a locally reduced material thickness.

The hinge arrangement of the bonnet arrangement may comprise a first hinge member adapted to be attached to a vehicle body and a second hinge member adapted to be attached to the bonnet. The first hinge member and the second hinge member may be pivotally connected to each other at the first pivot axis. The energy absorbing member may be attached to one of the first hinge member or the second hinge member at a position located between the attachment to the vehicle body, or bonnet, and the first pivot axis. The energy absorbing member may extend from the hinge arrangement towards the bonnet.

The first hinge member is attachable to the vehicle body, preferably in a fixed way, e.g., by attachment means in the form a screw, or a nut and bolt connection. The first pivot axis makes it possible to displace the bonnet in relation to the vehicle body by means of rotation around the first pivot axis.

If the energy absorbing member is attached to the second hinge member, it will follow the second hinge member, when the first and second hinge members pivot in relation to each other. This is appropriate for the case, wherein the energy absorbing member is attached to both the hinge arrangement and the bonnet.

If the energy absorbing member is attached to the hinge arrangement and arranged such that the bonnet will abut against it, the energy absorbing member may be attached to either one of the first and second hinge members.

If the energy absorbing member is attached to the bonnet and adapted to abut against the hinge arrangement, the energy absorbing member may be adapted to abut against either one of the first and second hinge members, or both of them. In that case, when opening the bonnet, the energy absorbing member will move away with the bonnet from the hinge arrangement, but at an impact situation, which usually occurs when the bonnet is closed, the energy absorbing member will be in abutment position or only with a small gap to the abutment position.

For any one of these cases the energy absorbing member may extend by between 1 and 150 mm, preferably by between 10 and 100 mm, more preferably by between 20 and 70 mm from the object it is attached to, e.g., the first hinge member, the second hinge member or the bonnet, in a direction away from that object. The extending length may be selected to inter alia provide the desired distance between the bonnet and the hinge arrangement.

In a second aspect of the present disclosure there is provided a hinge arrangement adapted for use in a bonnet arrangement according to above.

In a third aspect of the present disclosure there is provided a kit comprising a hinge arrangement for use in a bonnet arrangement, and a passive energy absorbing member for use in a bonnet arrangement. The energy absorbing member is positioned and arranged so as to absorb impact energy from an impact occurring at the bonnet in a region above the hinge arrangement.

The energy absorbing member may be manufactured and sold as a separate unit. Further, the hinge arrangement may be manufactured and sold as a separate unit. In addition, the kit mentioned above, comprising the hinge arrangement and the energy absorbing member, may be manufactured and sold as a unit, e.g., with the energy absorbing member mounted, or mountable, to the hinge arrangement, e.g., to its second hinge member.

The hinge arrangement of a kit may comprise a first hinge member adapted to be attached to a vehicle body, and a second hinge member adapted to be attached to a bonnet, the first hinge member and the second hinge member being pivotally connected to each other at a first pivot axis. The kit may further comprise an energy absorbing member being attached, or attachable, to one of the first hinge member or the second hinge member at a position located between the attachment to the vehicle body or bonnet and the first pivot axis, the energy absorbing member extending from the hinge arrangement towards the bonnet.

The energy absorbing member may comprise a bracket, a resilient member, such as a spring, and/or a hydraulic member. Further, what is described above, in relation to the bonnet arrangement, about the energy absorbing member and the first and second hinge members, is also applicable for this kit.

In a fourth aspect of the present disclosure there is provided a vehicle comprising the bonnet arrangement described above. By using a bonnet arrangement according to the disclosure, the HIC values will be acceptable also for the region of the bonnet being above the hinge arrangement.

In an embodiment, the hinge arrangement of the bonnet arrangement is located within an area at least partly defined by a line representing a 45 degree tangent of a front portion of the vehicle. This offers a high degree of freedom when configuring and designing the bonnet, the A-pillar, the front fender and/or the hinge arrangement.

The HIC value for an impact at the vehicle in a region above the hinge arrangement may be less than 1750, preferably less than 1000, and most preferably less than 650.

BRIEF DESCRIPTION OF THE DRAWINGS

Non-limiting examples according to the present disclosure will hereinafter be further explained with reference to the attached drawings wherein:

FIG. 6 is a schematic view of a vehicle according to the disclosure; and

FIG. 7 is a cross-section along the line VII-VII of FIG. 6.

It should be noted that the appended drawings are not necessarily drawn to scale and that the dimensions of some features of the present disclosure may have been exaggerated or minimized for the sake of clarity.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
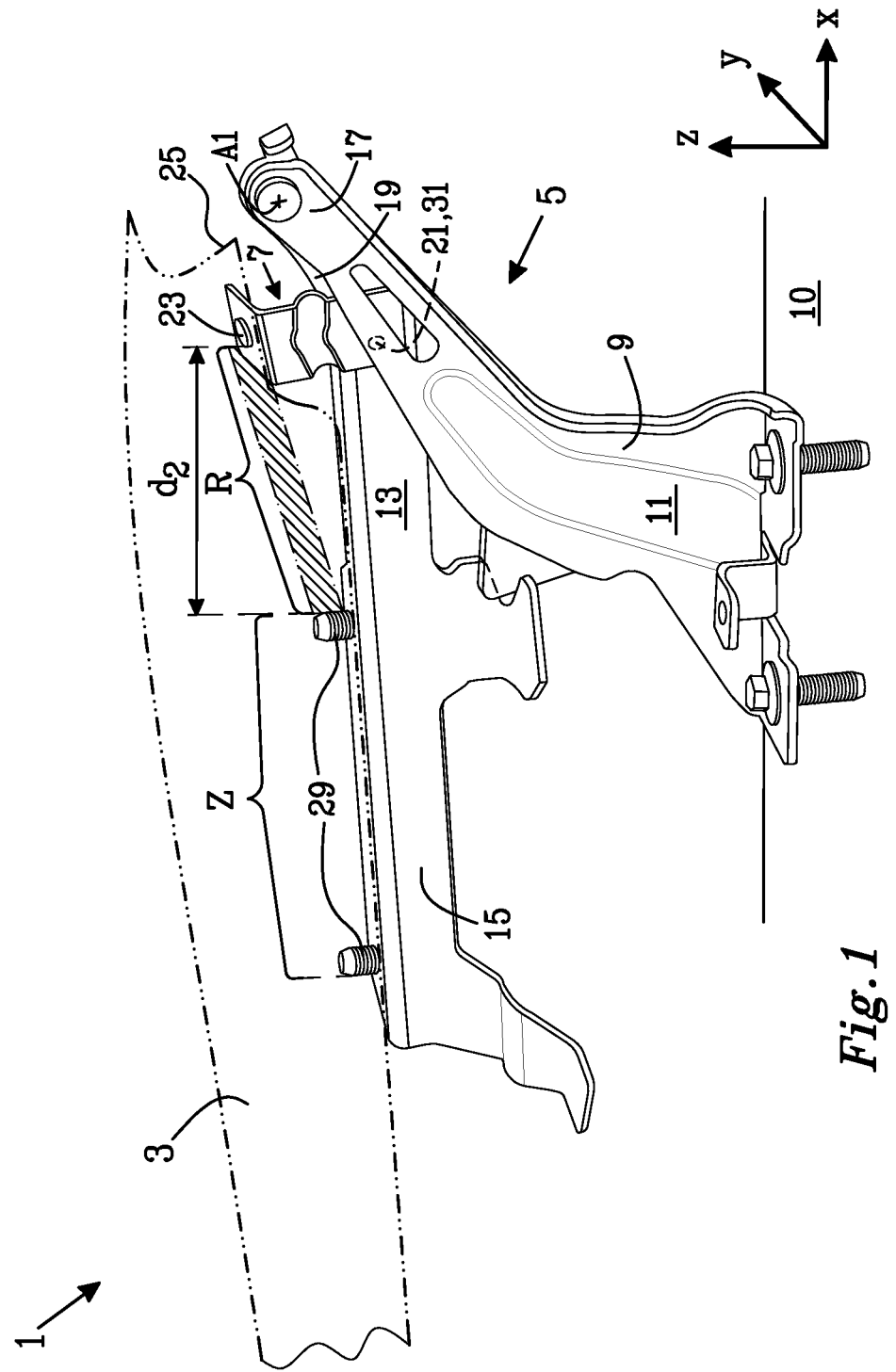
FIG. 1 is a schematic view of a bonnet arrangement according to a first embodiment of the disclosure.
Figure 2:
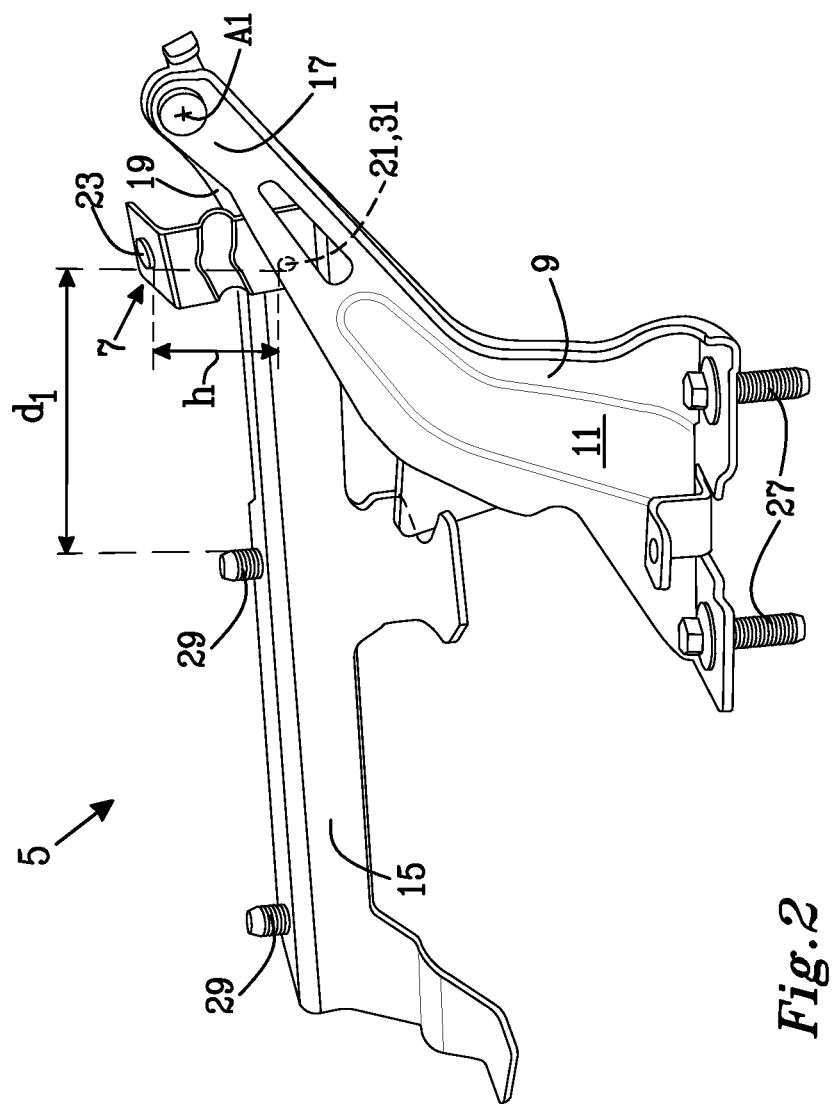
FIG. 2 illustrates a hinge arrangement and an energy absorbing member of the bonnet arrangement of FIG. 1.
Figure 3:
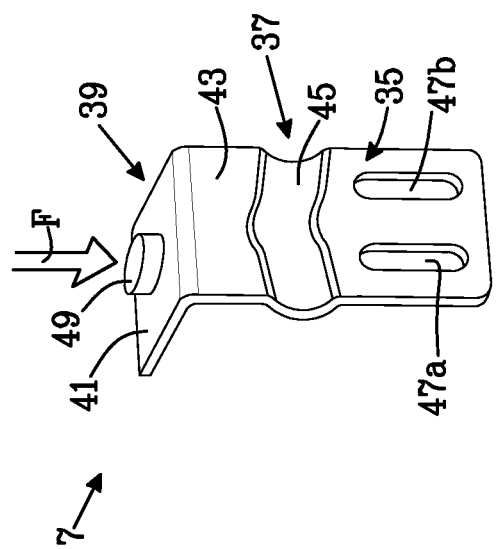
FIG. 3 illustrates the energy absorbing member of FIG. 1.

FIGS. 1-3 schematically illustrate a bonnet arrangement 1 according to a first embodiment of the disclosure in a perspective view. The bonnet arrangement 1 comprises a bonnet 3, a hinge arrangement 5, which will be more detailedly described in conjunction with FIG. 2, and a passive energy absorbing member 7, in the illustrated embodiment in the form of a bracket, which will be more detailedly described in conjunction with FIG. 3.

FIG. 1 further illustrates a coordinate system, wherein an x-axis is in the longitudinal direction of the vehicle, a y-axis in the lateral direction of the vehicle and a z-axis in the height direction of the vehicle, assuming the vehicle is standing on flat ground.

The illustrated embodiment shows a bracket as the energy absorbing member 7, but another kind of energy absorbing member is also feasible, such as a resilient member, e.g., a spring, or a hydraulic member. The function of the energy absorbing member 7 may be dual. It absorbs energy, preferably in a predefined controllable way, in case of an impact at the bonnet 3 in a region above the hinge arrangement 5. Further, the energy absorbing member 7 may work as a distance means between the bonnet 3 and the hinge arrangement 5.

The hinge arrangement 5 comprises a first hinge member 9, adapted to be attached to a vehicle body 10 at a first end region 11 of the first hinge member 9, and a second hinge member 13 attached to the bonnet 3 at a first end region 15 of the second hinge member 13. The first hinge member 9 and the second hinge member 13 are pivotally connected to each other at their respective second end regions 17, 19 at a first pivot axis A1. The energy absorbing member 7 is attached to the second hinge member 13 at a position 21 of the second hinge member 13 being located between the attachment to the bonnet 3 and the first pivot axis A1, in the illustrated embodiment about a third of the distance between the attachment to the bonnet 3 and the first pivot axis A1. The energy absorbing member 7 extends between the bonnet 3 and the second hinge member 13. The energy absorbing member 7 is attached to the bonnet 3 at a position 23 adjacent to a rear end 25 of the bonnet 3. When opening the bonnet 3, e.g., in order to gain access to an engine compartment, the energy absorbing member 7 will move together with the second hinge member 13 and the bonnet 3. The energy absorbing member 7 may be located at a smallest longitudinal distance of between 0 and 50 mm, preferably between 10 mm and 40 mm, and most preferably between 20 mm and 30 mm from the rear end 25 of the bonnet 3. By longitudinal distance is meant a distance measured in a plane being parallel to the ground, assuming the vehicle is standing on a flat ground, i.e., along the x-axis of FIG. 1.

The energy absorbing member 7 is arranged to absorb energy from an impact occurring at the bonnet 3 in a region above the hinge arrangement 5, e.g., directly above the hinge arrangement 5. Purely as an example, the impact could be from a head of a pedestrian, who has been hit by the vehicle and been thrown onto the bonnet 3. By using a bonnet arrangement 1 according to the disclosure, the likelihood of an injury to the head arising from the impact may be reduced as compared to for a bonnet according to prior art technology.

In the illustrated embodiment, the energy absorbing member 7 is attached to both the bonnet 3 and the hinge arrangement 5. However, as another option, the energy absorbing member 7 may be attached to the bonnet 3 only, such that the energy absorbing member 7 can abut against the hinge arrangement 5. As another option, the energy absorbing member 7 may be attached to the hinge arrangement 5 only, such that the bonnet 3 can abut against the energy absorbing member 7.

For the case that the energy absorbing member 7 is adapted for abutment at one of its ends, there may also be an initial gap, not illustrated, between the energy absorbing member 7 and the hinge arrangement 5 or the bonnet 3. In case of an impact at the bonnet 3 in a region above the hinge arrangement 5, the bonnet 3 may in that case first give way a short distance corresponding to the initial gap, and thereafter the energy absorbing member 7 starts absorbing energy.

In a vehicle comprising the illustrated embodiment of the bonnet arrangement 1, the hinge arrangement 5 is located below a relatively flat portion of the bonnet 3. Therefore, if measuring HIC values for such a vehicle, also the region of the bonnet 3 above the hinge arrangement 5 will be included. By using a bonnet arrangement according to the disclosure, the HIC values will be acceptable also for the region of the bonnet 3 being above the hinge arrangement 5.

This is in contrast to many prior art bonnet arrangements, wherein a head impact to the region of the bonnet being above the hinge arrangement would give a high likelihood of a head injury. Therefore, some prior art bonnet arrangements position the hinge arrangement closer to the lateral side of the vehicle, such that the hinge arrangement is located outside of the area used when measuring HIC values.

The bonnet 3 is attached to the hinge arrangement 5 at a hinge attachment zone Z. A first region R of the bonnet extends between the hinge attachment zone Z and the attachment of the energy absorbing member 7 to the bonnet 3. If looking at the bonnet arrangement 1 from the side, it can be seen that, in the first embodiment, the first region R of the bonnet 3, a part of the energy absorbing member 7, here between the attachment positions 21 and 23, and a part of the second hinge member 13, see along the longitudinal distance $d_1$ described below, form a closed perimeter, here a triangle, a shape which may be beneficial for absorbing energy.

FIG. 2 illustrates the hinge arrangement 5 of the first embodiment with the bonnet 3 removed for illustrative purposes. The first end region 11 of the first hinge member 9 is adapted to be attached to the vehicle body 10 by at least one first attachment device or means 27, e.g., a screw, or a nut and bolt connection. In the first embodiment, the first attachment means 27 comprises two attachment means, exemplified as screws. The first end region 15 of the second hinge member 13 is adapted to be attached to the bonnet 3 at the hinge attachment zone Z by at least one second attachment device or means 29, e.g., a screw, or a nut and bolt connection. In the illustrated embodiment there are two second attachment means 29. The energy absorbing member 7 is attached to the second hinge member 13 by means of at least one third attachment device or means 31, e.g., a screw, or a nut and bolt connection.

The smallest longitudinal distance $d_1$ for the second hinge member 13 between the hinge attachment zone and the energy absorbing member 7 is between 10 and 200 mm, preferably between 50 and 150 mm, more preferably between 75 and 125 mm. The smallest longitudinal distance $d_1$ for the second hinge member 13 is measured from the rearmost of the second attachment means 29 to the position 21, where the energy absorbing member 7 is attached to the second hinge member 13 by means of the most forward third attachment means 31. There is also a corresponding smallest longitudinal distance $d_2$ for the bonnet 3 from the hinge attachment zone Z to the attachment position 23 of the energy absorbing member 7 having substantially the same length, see FIG. 1. By longitudinal distance is meant a distance measured in a plane being parallel to the ground, assuming the vehicle is standing on a flat ground. Thus, if the second hinge member 13 is inclined in relation to the flat ground, the actual distance along the inclined second hinge member 13 will be longer, depending on the inclination angle, and similar for the bonnet 3.

The energy absorbing member 7 extends from the hinge arrangement 5, in the illustrated embodiment from the second hinge member 13, by between 1 and 150 mm, preferably by between 10 and 100 mm, more preferably by between 20 and 70 mm, towards the bonnet 3. The extension length h is measured in a vertical direction of the vehicle, i.e., in a direction being perpendicular to a flat ground, see the z-direction of FIG. 1. Further, the extension length h is measured from the position 21, where the energy absorbing member 7 is attached to the second hinge member 13 by means of the most forward third attachment means 31, to the position 23, where the energy absorbing member 7 is attached to the bonnet 3. In the illustrated embodiment, the energy absorbing member 7 is somewhat inclined in relation to the flat ground, such that the actual length along the energy absorbing member 7 from the position 21, where the energy absorbing member 7 is attached to the second hinge member 13 by means of the most forward third attachment means 31, to the position 23, where the energy absorbing member 7 is attached to the bonnet 3 is longer than the extension length h.

There is a similar, however mirror-inverted, hinge arrangement at the other lateral edge of the bonnet 3.

FIG. 3 is a detailed view of the energy absorbing member, in the illustrated embodiment in the form of a bracket 7. The bracket 7 comprises a hinge attachment portion 35, a deformation portion 37 and a bonnet support portion 39. The deformation portion 37 is located between the hinge attachment portion 35 and the bonnet support portion 39. The bonnet support portion 39 has a surface 41, which is substantially perpendicular to a main surface 43 of the deformation portion 37.

The deformation portion 37 is adapted to deform in a predefined way if a load F is applied, which load has a direction, see the arrow of FIG. 3, substantially perpendicular to the surface of the bonnet support portion 39 and substantially along the main surface 43 of the deformation portion 37. The deformation portion 37 comprises a deformation zone 45 having a surface being located out of the plane in relation to the main surface 43 of the deformation portion 37. When the load F is applied to the deformation portion 37, the deformation zone 45 will collapse sideways and bend further out of the plane of the main surface 43. Thereby, the deformation portion 37 deforms in a predefined way as response to the load F applied from substantially above. Such a load may be caused by the head of the pedestrian being hit by the vehicle and landing on the bonnet 3.

As an alternative, or a complement, however not illustrated in FIG. 3, the predefined deformation of the deformation portion 37, and thus the bracket 7, may instead be controlled by at least one opening going through the deformation portion 37, or a notch in the deformation portion 37, due to a reduced material thickness of the deformation zone 45 in relation to the rest of the bracket 7, and/or due to another material of the deformation zone 45 than the rest of the bracket 7.

The hinge attachment portion 35 is adapted for attachment to a hinge member 9, 13 of the bonnet arrangement 1, as described above, in this case the second hinge member 13. In the illustrated embodiment, the hinge attachment portion 35 comprises two openings, a first opening 47a and a second opening 47b. The first opening 47a is used when attaching the bracket 7 to a hinge member intended to be located at a left-hand side of a bonnet, e.g., by a third attachment means 31, as seen in FIGS. 1 and 2. The second opening 47b is used when attaching the bracket 7 to a hinge member 9, 13 of a bonnet arrangement intended to be located at a right-hand side of the bonnet 3, i.e. being mirror-inverted, e.g., by means of the third attachment means. Thereby, the same kind of bracket 7 may be used at the hinge arrangements 5 at either side of the bonnet 3. Other fastening arrangements are also feasible, such as using only one opening, which in that case preferably is located at the centerline of the bracket 7, which in this case would be between the first opening 47a and the second opening 47b.

The bonnet support portion 39 is adapted for attachment to the bonnet 3, as described above. This may be done by means of a fourth attachment device or means 49, e.g., an adhesive, a rivet, a screw, a weld screw or a weld nut.

Figure 4:
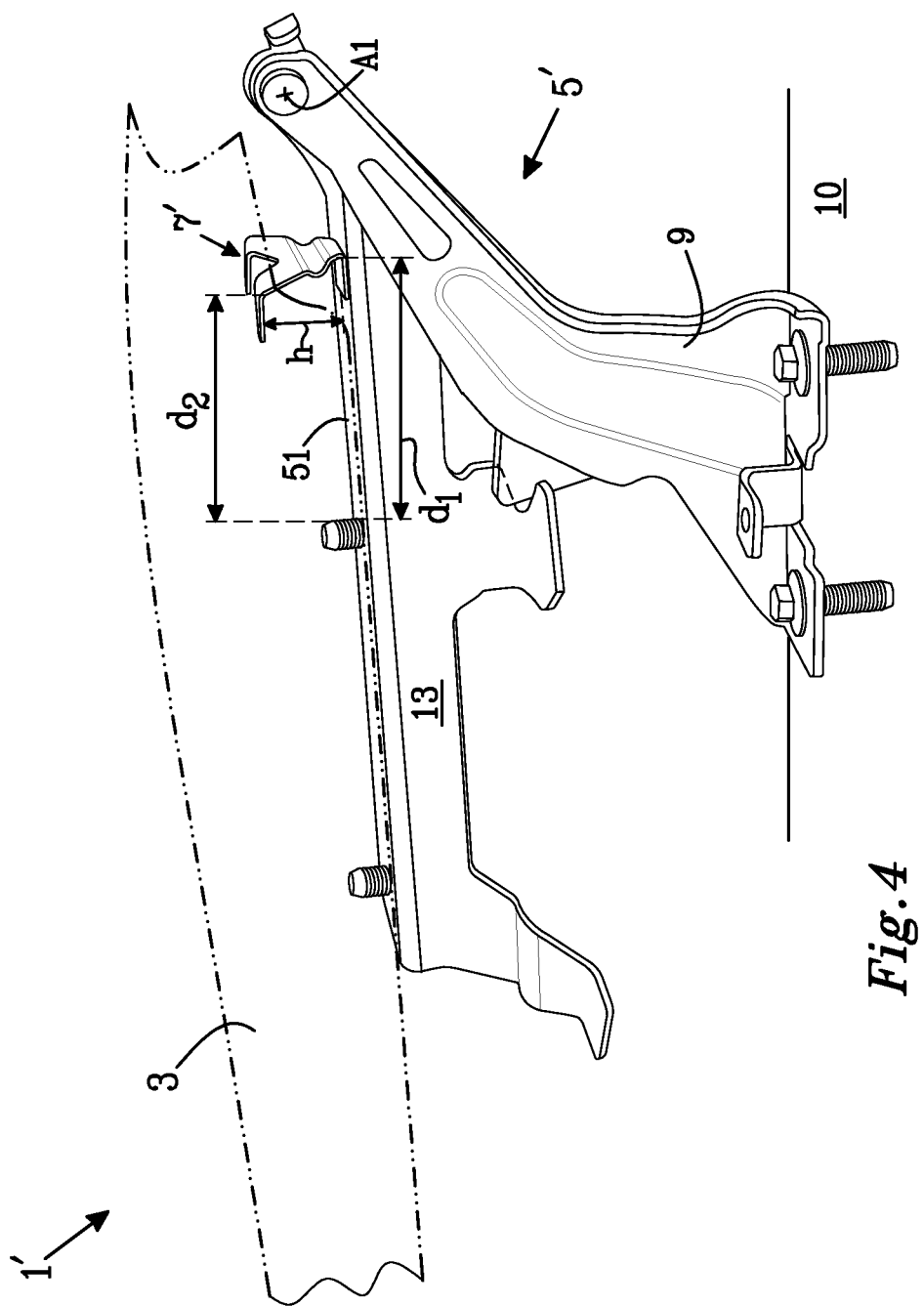
FIG. 4 is a schematic view of a bonnet arrangement according to a second embodiment of the disclosure.

FIG. 4 illustrates a bonnet arrangement 1' according to a second embodiment of the disclosure. The second embodiment differs from the first embodiment, in that the energy absorbing member 7' abuts against an upper side 51 of the second hinge member 13, e.g., a flange thereof. The energy absorbing member 7' may be attached to the bonnet 3 and/or to the second hinge member 13, by attachment means like the ones mentioned above.

Figure 5:
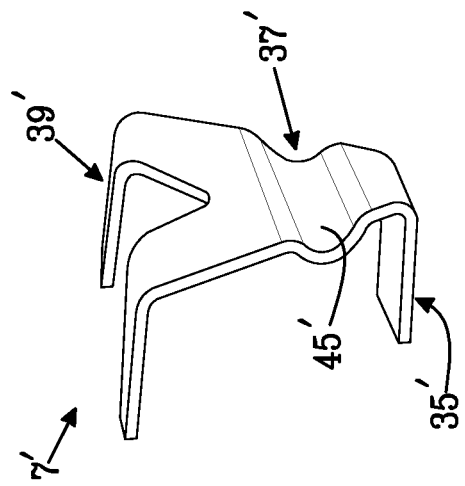
FIG. 5 illustrates an energy absorbing member of the embodiment of FIG. 4.

The energy absorbing member 7' is in the illustrated embodiment a bracket comprising a deformation zone 45', see FIG. 5. Due to the different orientation of the bracket 7' of the second embodiment as compared to the bracket 7 of the first embodiment, the deformation zone 45 will deform in the longitudinal direction of the vehicle. The other details of the second embodiment are similar to those of the first embodiment and will not be explained again.

FIG. 6 is a schematic view of a vehicle 53 according to the disclosure. The vehicle 53 comprises a front portion 55. The front portion 55 comprises the bonnet 3 and a front fender 57a, 57b at each lateral side of the vehicle 53. FIG. 7 is a cross-section along the line VII-VII of FIG. 6. A 45-degree tangent $T_{45}$ touches the front portion 55, here the front fender 57a, at a 45-degree angle to the horizontal plane. Seen over the whole front 55, a 45 degree line $L_{45}$ is a line drawn through the points where the 45-degree tangents $T_{45}$ touch the front portion 55. By using a bonnet arrangement 1, 1' according to the disclosure in the vehicle 53, the HIC values will be acceptable, i.e. below 1750, preferably below 1500, more preferably below 1000 and most preferably below 650 also for a configuration with the hinge arrangement 5 located within an area at least partly defined by the 45 degree line $L_{45}$, as seen in FIG. 6.

The configuration of the energy absorbing member 7, 7', in particular how it is configured and dimensioned to absorb impact energy, is preferably selected considering the mechanical properties of the bonnet 3, in particular the impact properties, such that the bonnet arrangement 1, 1' as a whole will reduce the likelihood of a head injury if the impact occurs at the bonnet 3 in a region above the hinge arrangement 5, 5'.

The energy absorbing member 7, 7' may be manufactured and sold as a separate unit. Further, the hinge arrangement 5 may be manufactured and sold as a separate unit. In addition a kit comprising the hinge arrangement 5 and the energy absorbing member 7, 7' may be manufactured and sold as a unit, e.g., with the energy absorbing member 7, 7' mounted, or mountable, to the hinge arrangement 5, e.g. to its second hinge member 13.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. As such, the present disclosure should not be considered as limited by the embodiments and figures described herein. Rather, the full scope of the invention should be determined by the appended claims, with reference to the description and drawings.

What is claimed is:

1. A bonnet arrangement for a vehicle, the bonnet arrangement comprising:
   a bonnet;
   a hinge arrangement adapted to be attached to the bonnet, the hinge arrangement being configured to permit pivotal displacement of the bonnet relative to the vehicle around a first pivot axis located in the hinge arrangement; and
   a passive energy absorbing member adapted to be positioned so as to absorb impact energy from an impact occurring at the bonnet in a region above the hinge arrangement.

2. The bonnet arrangement according to claim 1 wherein the energy absorbing member is adapted to be located at least partly above the hinge arrangement when the bonnet arrangement is mounted in the vehicle.

3. The bonnet arrangement according to claim 1 wherein the bonnet has a longitudinal extension in an intended direction of travel and has a rear end, the hinge arrangement is adapted to be attached to the bonnet at a hinge attachment zone, and the energy absorbing member is adapted to be located longitudinally rearwards of the hinge attachment zone.

4. The bonnet arrangement according to claim 3 wherein the energy absorbing member is located at or adjacent to the rear end of the bonnet.

5. The bonnet arrangement according to claim 3 wherein a smallest longitudinal distance between the hinge attachment zone and the energy absorbing member is between 10 and 200 mm.

6. The bonnet arrangement according to claim 1 wherein the energy absorbing member extends between a portion of the bonnet and a portion of the hinge arrangement.

7. The bonnet arrangement according to claim 1 wherein the energy absorbing member comprises a bracket, a resilient member and/or a hydraulic member.

8. The bonnet arrangement according to claim 1 wherein the energy absorbing member is adapted to deform in a predefined way.

9. The bonnet arrangement according to claim 1 wherein the hinge arrangement comprises:
   a first hinge member adapted to be attached to a vehicle body at a first attachment location; and
   a second hinge member attached to the bonnet at a second attachment location;
   wherein the first hinge member and the second hinge member are pivotally connected to each other at the first pivot axis;
   and wherein the energy absorbing member is attached to one of the first hinge member or the second hinge member at a position located between the first attachment location or the second attachment location and the first pivot axis, the energy absorbing member extending from the hinge arrangement towards the bonnet.

10. The bonnet arrangement according to claim 9 wherein the energy absorbing member extends by between 1 and 150 mm away from the one of the first hinge member or the second hinge member to which the energy absorbing member is attached.

11. The bonnet arrangement according to claim 1 wherein the energy absorbing member is attached to the bonnet and extends in a direction towards the hinge arrangement.

12. The bonnet arrangement according to claim 1 wherein the energy absorbing member is attached at a first end to the hinge arrangement and at a second end to the bonnet.

13. A vehicle comprising the bonnet arrangement according to claim 1.

14. The vehicle according to claim 13 wherein the hinge arrangement of the bonnet arrangement is located within an area at least partly defined by a line representing a 45 degree tangent of a front portion of the vehicle.

15. The vehicle according to claim 13 wherein a Head Injury Criterion value for an impact at the vehicle in a region above the hinge arrangement is less than 1750.

16. The bonnet arrangement according to claim 1 wherein the hinge arrangement is adapted to be positioned underneath the bonnet when the bonnet arrangement is mounted in the vehicle, and the energy absorbing member is arrangeable between the hinge arrangement and the bonnet.

17. The bonnet arrangement according to claim 16 wherein the hinge arrangement comprises a first hinge member adapted to be attached to a vehicle body at a first attachment location, and a second hinge member attached to the bonnet at a second attachment location, the first hinge member and the second hinge member being pivotally connected to each other at the first pivot axis, and wherein the energy absorbing member is attached to one of the first hinge member or the second hinge member at a position located between the first attachment location or the second attachment location and the first pivot axis, the energy absorbing member extending from the hinge arrangement towards the bonnet.

18. A kit for use with a bonnet of a vehicle, the kit comprising:
   a hinge arrangement adapted to be attached to the bonnet and configured to permit pivotal displacement of the bonnet about a first pivot axis of the hinge arrangement; and
   a passive energy absorbing member arrangeable with respect to the hinge arrangement so as to absorb impact energy from an impact occurring at the bonnet in a region above the hinge arrangement.

19. The kit according to claim 18 wherein the hinge arrangement is adapted to be positioned underneath the bonnet, and the energy absorbing member is arrangeable between the hinge arrangement and the bonnet.

20. The kit according to claim 19 wherein the hinge arrangement comprises a first hinge member adapted to be attached to a vehicle body at a first attachment location, and a second hinge member adapted to be attached to the bonnet at a second attachment location, the first hinge member and the second hinge member being pivotally connected to each other at the first pivot axis, and wherein the energy absorbing member is adapted to be attached to one of the first hinge member or the second hinge member at a position located between the first attachment location or the second attachment location and the first pivot axis, the energy absorbing member being configured to extend from the hinge arrangement towards the bonnet.

* * * * *